Patented Mar. 31, 1936

2,035,449

UNITED STATES PATENT OFFICE 2,035,449

PURIFYING NAPHTHA

Francis M. Archibald and Philip Janssen, Elizabeth, N. J., assignors to Standard Alcohol Company No Drawing. Application November 21, 1933, Serial No. 699,036

9 Claims. (Cl. 260—99.12)

This invention relates to a process of purifying naphtha, particularly naphtha, containing unsaturated hydrocarbons, that is to be contacted with acids to prepare reactive acid liquors from which alcohols may be obtained by distillation.

In the art of making secondary alcohols from normal olefines occurring in petroleum hydrocarbons, it is well known that certain other compounds are present that react with the acid used, such as sulfuric or phosphoric, etc., and interfere with the absorption of the normal olefines in the acid. This lowers the alcohol yields and in addition, introduces impurities and produces degradation products.

In the class of harmful compounds are the olefines from which, under proper conditions, tertiary alcohols can be prepared. It is known that these tertiary olefines can be removed by treating petroleum hydrocarbons with dilute acids.

Other harmful compounds are iso-olefines in which the double bond is only one carbon atom away from the tertiary carbon atom, for example, isopropyl ethylene. These iso-olefines are not reacted upon by weak acids such as are used for removing tertiary olefines. On the other hand, they are equally harmful because they undergo a transformation to the tertiary olefines when they come in contact with stronger acids during the olefine absorption process. Under these circumstances, the iso-olefines produce all the undesirable effects that are caused by the tertiary olefines. For these reasons, it has been found in practice that the use of dilute acids to remove tertiary olefines shows no advantage over using a mixture of all the petroleum hydrocarbons. In other words, the presence of the iso-olefines destroys any advantage obtained in removing the tertiary olefines. Other harmful compounds present are the sulfur compounds, such as mercaptans, which impart an objectionable odor to the finished alcohol unless removed by a preliminary or subsequent treatment.

An object of this invention is to remove the deleterious compounds from a naphtha before contacting the naphtha with sulfuric acid in the production of a reactive acid liquor from which alcohols are distilled.

The following example clearly illustrates the process:

The petroleum hydrocarbons are first vaporized, if necessary, and the vapor is then passed over a catalyst such as bauxite, kaolin, silica gel, etc. at a temperature of about 225° C. to 500° C. This treatment with the above catalysts decomposes the more stable mercaptans to olefines and hydrogen sulfide while simultaneously rearranging or isomerizing the hydrocarbons as, for example, converting isopropyl ethylene into trimethyl ethylene. These catalysts will hereafter be referred to as de-sulfo-isomerizing catalysts. The hydrocarbons are then treated to remove hydrogen sulfide. This may be done by scrubbing with an aqueous caustic solution such as that of sodium hydroxide, or by contacting with one or more of the materials used in purifying gases, for example, an alkaline ironoxide-containing material such as the residue obtained after treating bauxite with sodium hydroxide to remove aluminum. The vapors are condensed and the condensate contacted with a weak acid, such as 65 to 70% strength sulfuric acid, to remove the tertiary olefines originally present in the petroleum hydrocarbons as well as the tertiary olefines formed by the catalytic process. The resulting hydrocarbons thus obtained are greatly improved in that the deleterious compounds are removed and are now contacted with strong sulfuric acid of 80 to 90% strength to produce reactive acid liquors from which after dilution, alcohols may be distilled.

The foregoing description is merely illustrative and alternative arrangement may be made within the scope of the appended claims in which it is our intention to claim all novelty as broadly as the prior art permits.

We claim:

1. The process of purifying naphtha containing iso-olefines that is to be extracted with acids to prepare reactive acid liquors from which alcohols are to be distilled, which comprises vaporizing the naphtha, passing the naphtha vapor over a refractory catalyst suitable for the dehydration of alcohols at a temperature of about 225° to 500° C., removing hydrogen sulfide, and removing tertiary olefines.

2. The process of purifying naphtha containing iso-olefines that is to be contacted with acids to prepare reactive acid liquors from which alcohols are to be distilled, which comprises subjecting the naphtha to a heat treatment in the presence of a refractory dehydration catalyst in which organic sulfur compounds are converted to olefines and hydrogen sulfide and the iso-olefines are converted to tertiary olefines, removing components that react with alkalies and removing components that react with weak acids.

3. The process of purifying naphtha containing iso-olefines, which comprises passing naphtha over a refractory catalyst suitable for the dehydration of alcohols, scrubbing the naphtha with an alkaline solution and treating the naphtha with a sulfuric acid of 65 to 70% strength.

4. The process of purifying naphtha containing iso-olefines, which comprises passing naphtha over a refractory catalyst suitable for the dehydration of alcohols, contacting the naphtha with alkaline iron oxide containing material obtained after treating bauxite with sodium hydroxide to remove aluminum and treating the naphtha with a sulfuric acid of 65 to 70% strength.

5. The process of preparing a reactive acid liquor, which comprises passing a naphtha containing iso-olefines over a refractory catalyst suitable for the dehydration of alcohols, scrubbing the naphtha with an alkaline solution, treating the naphtha with a sulfuric acid of 65 to 70% strength, separating the acid, and treating the naphtha with a sulfuric acid of 80 to 90% strength.

6. The process of preparing a reactive acid liquor, which comprises passing naphtha containing iso-olefines over bauxite at a temperature of about 225° to 500° C., removing the hydrogen sulfide, removing the tertiary olefines, treating the naphtha with a sulfuric acid of 80 to 90% strength, and separating the acid liquor.

7. In the process in which a hydrocarbon mixture containing olefines, tertiary olefines, and iso-olefines is subjected to treatment with a weak poly-basic inorganic acid to remove tertiary olefines, and then to a treatment with concentrated poly-basic inorganic acid to effect a combination of the olefines with said acid to form a reactive liquor for the production of alcohols, the preliminary step of subjecting the initial material to a treatment suitable for the conversion of iso-olefines to tertiary olefines.

8. A process according to the preceding claim in which the preliminary treatment to which the initial material is subjected is the contacting of said initial material with a refractory catalyst suitable for the dehydration of alcohols at a temperature between about 225° and 500° C.

9. The process of converting iso-olefines into tertiary olefines which comprises contacting said olefines, with a refractory catalyst suitable for the dehydration of alcohols at a temperature between about 225° and 500° C.

FRANCIS M. ARCHIBALD.
PHILIP JANSSEN.